United States Patent

[11] 3,631,638

| [72] | Inventors | Takayuki Yoshikawa;<br>Hironobu Maki; Tadao Kamiya, all of<br>Nagoya-shi, Aichi-ken, Japan |
|------|-----------|---|
| [21] | Appl. No. | 879,462 |
| [22] | Filed     | Nov. 24, 1969 |
| [45] | Patented  | Jan. 4, 1972 |
| [73] | Assignee  | Nippon Toki Kabushiki Kaisha<br>Nagoya-shi, Aichi-ken, Japan |
| [32] | Priority  | June 17, 1969 |
| [33] |           | Japan |
| [31] |           | 44/47752 |

[54] PROCESS FOR THE MANUFACTURE OF A GRINDING STONE
8 Claims, 10 Drawing Figs.

[52] U.S. Cl. .................................................. 51/295,
51/297, 51/298
[51] Int. Cl. ......................................................... B24d 11/00,
C08h 17/12
[50] Field of Search ........................................... 51/293,
295, 297, 298

[56] References Cited
UNITED STATES PATENTS

| 1,988,065 | 1/1935 | Wooddell | 51/293 |
| 2,076,517 | 4/1937 | Robie    | 51/298 |
| 2,876,086 | 3/1959 | Raymond  | 51/293 |
| 3,048,482 | 8/1962 | Hurst    | 51/298 |
| 3,246,430 | 4/1966 | Hurst    | 51/293 |

*Primary Examiner*—Donald J. Arnold
*Attorney*—Stevens, Davis, Miller & Mosher

ABSTRACT: A process for the manufacture of a grinding stone characterized by compounding a liquid binder such as synthetic resin and rubber in liquid form, with powdery abrasive to form a compound thereof which is then printed on a support such as a glass fiber or synthetic resin fiber cloth, using the screen printing technique, to form a layer of the compound on the support, and then curing the compound layer to produce the grinding stone.

PATENTED JAN 4 1972 3,631,638
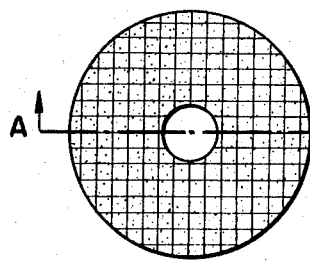
FIG. 1
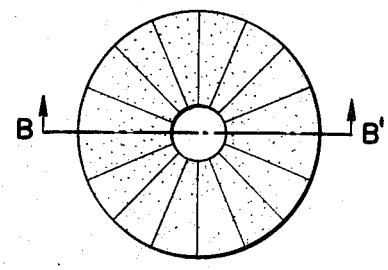
FIG. 3
FIG. 2
FIG. 4
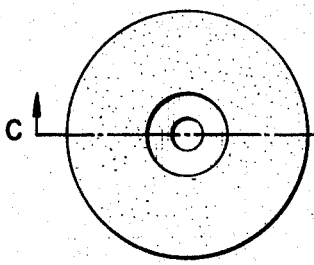
FIG. 5
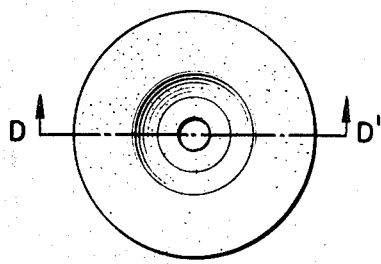
FIG. 7
FIG. 6
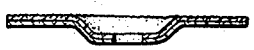
FIG. 8
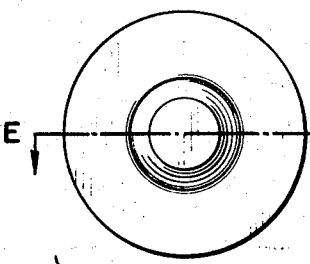
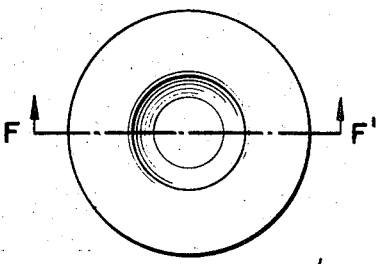
FIG. 9
FIG. 10

PROCESS FOR THE MANUFACTURE OF A GRINDING STONE

This invention relates to a process for manufacturing a new-type flexible or elastic grinding stone. The demand for conventional-type elastic grinding stones wherein synthetic resin or natural or synthetic rubber is used as a binder, has recently been remarkably increased and is now greater than that for vitrified grinding stones wherein a ceramic binder is used as such, which vitrified grinding stones have hitherto been the most generally used ones. These conventional elastic abrasive grinding stones have found their various new uses because of their satisfactory elasticity and strength. They have come to be indispensable for efficiently cutting very thin steel sheets and the like, trimming cast articles and polishing the welded portions of articles. Such elastic grinding stones have been manufactured in various ways depending upon the kind of a binder used. Elastic grinding stones wherein phenol-formaldehyde resin is used as the binder, said resin being in the most common use as a binder, are prepared by adding to abrasive grains novolak-type powdered resin, which is the main constituent of the binder, together with a suitable wetting agent such as a resol-type phenol-formaldehyde resin, furfural or the like, introducing the resulting mixture into a mold in which it is pressure molded to a predetermined shape, and then aging the molding; while elastic grinding stones wherein natural or synthetic rubber is used as a binder, are prepared by kneading the rubber by means of rolls and thereafter kneading the rubber with abrasive grains, rolling the resulting mixture to produce a sheet thereof having a predetermined thickness, stamping out the sheet to make pieces thereof having a predetermined shape and then curing or vulcanizing the pieces to obtain the desired grinders.

It is needless to say that, in addition to said constituents, suitable fillers, abrasive adjuvants, curing agents and accelerators may be used in the manufacture of such grinders as required. The above-mentioned step of pressure molding may be effected under heat. In addition, an elastic grinding stone-manufacturing process including a step of casting in a mold abrasive particles suspended in a binder in the liquid form, is thought to be feasible. As to this process, there have been proposed a few suggestions, which are not yet put to practical use in this and foreign countries because of the present unsatisfactory performance of products and efficiency of operations.

In view of the properties and performance of elastic grinding stones prepared by the conventional processes which have hitherto been known, it is believed that the grinding stones comprise abrasive particles only physically bonded to each other with a binder. Generally speaking, abrasive grains are inorganic ones such as particulate fused alumina, sintered alumina, silicon carbide, boron carbide, diamond and the like, while binders are organic materials. It would thus be impossible that the abrasive particles and binder can be chemically combined with each other without subjecting them to specific treatments.

It is to be noted that the most important thing to obtain the best physical bonding of abrasive particles by use of a binder, is to thoroughly wet the abrasive articles with the binder thereby increasing bonding area therebetween. The pressure molding process has a disadvantage that abrasive particles must be crushed under pressure. However, this disadvantage can be eliminated by means of casting method using a binder in the liquid form. In view of these facts, it appears preferable to cast a mixture of the starting materials in a mold using a liquid binder as such in the mixture. However, in fact, this casting or molding process has disadvantages that the shapes of products are limited and such casting needs many techniques and involves many difficulties.

The novel process of this invention is the one in which a binder in the liquid form is used and is characterized by mixing a liquid binder with abrasive particles and coating the resulting mixture on a suitable substrate using the screen printing technique.

Liquid binders which may be used in the practice of this invention, include resol-type phenol-formaldehyde resins such as Varcum 8116, 8121 and 8142 produced by Varcum Chemical Co. and BRL-1251, BRL-4858 and BRL-1448 produced by Union Carbide Corporation; novolak-type phenol-formaldehyde resins (liquid type); a mixture of said resol-type resin with the novolak-type phenol-formaldehyde resin; and a solution of phenol-formaldehyde resin in furfural, methanol, ethanol or the like solvent. As such liquid binders, there can also be used novolak-type solid phenol-formaldehyde, epoxy and unsaturated polyester, resins and rubbers when these resins and rubbers are liquidized by heating. The above-mentioned novolak-type resins include various resins (from long plate flow to short plate flow) such as Varcum–1364, 1930 and 3030 produced by Varcum Chemical Co. and BRP–5417, BRP–8740 and BRP–8552 produced by Union Carbide Corporation; epoxy-modified phenol-formaldehyde resins such as Varcum–1930; and rubber-modified phenol-formaldehyde resins such as BRP–8219.

Other binders which may be used, are an epoxy resin (such as Epikote 815 produced by Shell Chemical Co.) incorporated with suitable curing agent (such as MPD or meta-phenylenediamine), an unsaturated polyester (such as Vibrin (US Rubber Co., Naugatuck Chemical Div.), GE polyester (General Electric Co.) and Polylite (Reichhold Chemicals Inc.)) incorporated with as catalyst a peroxide, preferably MEKP (methyl ethyl ketone peroxide) and a solution of natural or synthetic rubber in an organic solvent, the synthetic rubber including SBR (butadiene-styrene), NBR (butadiene-acrylonitrile) and the like and the organic solvent including benzol, toluol and the like.

Abrasive particles which may be used in the practice of this invention, include diamond powder, fused alumina, sintered alumina, silicon carbide, boron carbide, emery, garnet and the like. Of these abrasives, fused alumina, sintered alumina and silicon carbide are in the most frequent use. Said fused alumina includes friable fused alumina, such as 4A of Japan Industrial Standard (JIS) R6111, 38A produced by Norton Co. and C–34 produced by Carborundum Co., having an extremely high content of alumina, and populax semifriable fused alumina which is made from ordinary bauxite by use of the usual method, such as 2A of Japan Industrial Standard (JIS) R6111, Regular A (Alundum) produced by Norton Co. and C–32 produced by Carborundum Co., containing iron oxide and titanium oxide, and other polycrystalline fused alumina such as 44A produced by Norton Co. and R–46 produced by Carborundum Co., and another fused alumina containing zirconia such as R–71 produced by Carborundum Co. and AZ–40 produced by Exolon Co.

Sintered alumina which may be used, includes 75A produced by Norton Co. and R–62 (Carborod) produced by Carborundum Co.

And silicon carbide which may usually be used as an abrasive material, includes 4C and 2C prescribed in Japan Industrial Standard (JIS) R6111, C–5 and C–2 produced by Carborundum Co., and 37 Crystlon and 39 Crystlon prepared by Norton Co.

These abrasive particles may be generally the same as the conventionally used ones in size and should preferably have 12 to 2,000-mesh size.

The previously mentioned preparation or compound comprising abrasive particles wetted with a liquid binder may be incorporated with the same fillers, curing agents, and other additives as those used in the conventional grinding stones wherein an organic matter is used as a binder. The fillers are preferably finer than 60 mesh and they include pyrite, cryolite, zinc sulfide, calcium carbonate, magnesium carbonate, magnesium oxide, clay, zinc oxide, talc, diatomaceous earth, mica, asbestos, graphite, barium sulfate, pumice and the like; the curing agents include sulfur, sulfur monochloride, litharge, zinc oxide, selenium, tellurium, magnesia, organic peroxides such as p-quinone dioxime, p,p'-dibenzoyl quinone dioxime and dicumyl peroxide, organic polysulfides, Amberol ST-137 (Rohm & Haas), and the like; the accelerators include inorganic accelerators such as slaked lime, magnesia and the like, and organic accelerators such as acetoaldehyde ammonia, hexamethylene tetraamine, acetoaldehyde aniline (condensate), diphenyl guanidine, 2-mercapto benzothiazol, N-cyclohexyl-2-benzothiazol sulfonamide, tetramethyl thiuram monosulfide, zinc salt of dimethyl dithiocarbamic acid and the like; and the other additives include accelerating adjuvants such as zinc oxide, aliphatic acids and the like, activators such as dicyclohexylamine, triethanolamine and the like, retarders such as phthalic acid, N-nitrosodiphenylamine, trichloromelamine, dibenzylamine and the like, antioxidants and antiozonants such as pheny α-naphthylamine, aldol α-naphthylamine, 6-ethoxy-2,2,4-trimethyl-1,2-dihydroquinoline, alkylphenol derivatives and the like, reinforcing agents such as carbon black, white carbon (silicate compound) and the like, softeners such as fatty acids and oils (for instance, stearic acid and cotton seed oil), asphalt, paraffin wax, DBP, DOP and the like, tackifiers such as cumarone-indene resins, phenol-formaldehyde resins and the like, peptizers such as pentachlorothiophenol, naphthyl-β-mercaptane and the like, color pigments such as carbon black, titanium oxide and the like, and stiffeners (this being added to unvulcanized rubber to harden it thereby preventing it from getting out of its shape during the processing) such as benzidine, paraaminophenol, dihydrazine oxalate and the like.

By adding these various additives to said compound, its viscosity is adjusted to the appropriate level on which the subsequent operations are conveniently performed.

To this end the proportion of abrasive particles in he compound should be between 30 and 90 percent by weight, preferably 50 to 80 percent by weight. The high proportion of the abrasive material makes high the viscosity of the compound thereby rendering impossible the performance of the subsequent operations, the small proportion thereof leads to poor grinding performance of a grinding stone to be produced. The compound should contain 5-70 percent, preferably 10-50 percent, of the liquid binder. When the proportion of the binder present in the compound is large, that of the abrasive particles resent therein is necessarily small thereby decreasing the grinding ability of a grinding stone to be produced. On the other hand, a small proportion of the binder leads to the increase of viscosity of the compound, thereby making impossible the performance of the subsequent operations. The additives should preferably be contained in the compound in an amount of 0-50 percent.

The compound comprising abrasive particles, a resinous binder and other additives will be easily squeezed through a screen even if the proportion of the binder used is relatively small, when the compound is heated to 40°-150° C., preferably 50°-65° C. and the screen is heated to 40°-120° C., preferably 50°-80° C.

The compound thus obtained is then squeezed onto a support, such as paper, glass fiber cloth, nonwoven glass fiber cloth, nonwoven synthetic resin cloth or the like having a predetermined shape, through a screen superimposed on the support by use of a squeezer. If the surface of a grinding stone to be produced is required to be patterned, this is achieved by using a screen to the surface of which is applied paper or any other suitable material having the desired pattern in the squeezing step.

The process of this invention comprises the steps of: adding to any one of the previously mentioned liquid binders any one of the above-mentioned abrasive particles and, if desired, at least one of the foregoing additives to obtain a compound having the desired viscosity, squeezing the thus obtained compound onto a support, such as paper, glass fiber cloth, nonwoven synthetic resin cloth or the like, through the meshes of a screen superimposed on the support by means of a squeezer to produce a print of the compound on the support, removing the screen from the print and then drying and curing the binder contained in the print to obtain a grinding stone.

Screens or sieves which may be used in the practice of this invention, are made of any suitable material such as brass, phosphor bronze, stainless steel, polyamide, polyester, silk or the like.

The screens are preferably wire cloth sieves and plate sieves. They may preferably have meshes which are round, triangular, square or hexagonal in shape and they may be formed in such a manner that their meshes are spirally arranged in addition to the regular arrangement.

When a wire cloth screen is intended to be used, the size of the component wire and of the meshes thereof should be determined depending the composition of a compound from which the desired grinding stones are obtained. An ordinary screen has a 3-200 mesh size, preferably a 6-60 mesh size, or equivalents thereto.

As a screen, stainless steel having excellent wear resistance is materially suitable for a compound containing coarse abrasive particles while polyamide resin having flexibility for a compound containing fine abrasive particles. The thickness of the layer, squeezed onto the support, of the compound can be controlled as desired by keeping the screen suitably apart from the support during the squeezing or by repeating squeezing of the compound through the screen. If there is desired a grinder having the screen pattern on the surfaces, this is achieved by bonding the compound layers, which have the pattern on the surface, to each other with the patterned surface kept outside.

The grinding stone obtained according to this invention may have a screen pattern on at least one side thereof. It is therefore superior in grinding performance and can be obtained in a very thin form.

FIG. 1 is a plan view of a cutting grinding stone manufactured according to this invention;

FIG. 2 is a cross-sectional view of the grinding stone shown in FIG. 1, the cross-sectional view bring taken on line A—A';

FIG. 3 is a plan view of a flat-type grinding stone for the general purpose;

FIG. 4 is a cross-sectional view, taken on line B—B' of the grinding stone shown in FIG. 3;

FIG. 5 is a plan view of an offset-type grinding stone; and

FIG. 6 is a cross-sectional view, taken on line C—C' of the grinding stone shown in FIG. 5;

FIG. 7 is a plan view of a grinding stone prepared by casting and curing the corresponding green grinding stone in dies shown in FIGS. 9 and 10;

FIG. 8 is a cross-sectional view, taken on line D—D'; and

FIGS. 9 and 10 are a plan view of the dies coated with Teflon (polytetrafluoroethylene) and a cross-sectional view of the dies, taken on lone F—F', respectively.

For instance, the cutting grinding stone shown in FIGS. 1 and 2 has rough surfaces and consequently a great grinding ability. It is also in a very thin form thereby giving less frictional resistance, eliminating the burning of a material to be ground and increasing its lifetime as grinding stone.

The grinder for the general purpose, obtained according to this invention, as shown in FIGS. 3 and 4 can prevent itself from being overheated when put to use because it has gaps formed between the layers thereof, the gaps allowing a grinding fluid to pass therethrough.

The grinding stone shown in FIGS. 5 and 6 is an offset grinding stone wherein each support has a thin abrasive grinding layer formed on one side thereof while it has a hub secured to the other side thereof.

The process of this invention will be better understood by the nonlimitative examples, and many variations and modifications thereof can be made without departing from the spirits and scope of this invention.

EXAMPLE 1

Eighty parts by weight of semifriable fused alumina abrasive particles (Carborundum Co., C-32, No. 36 ), 20 parts of resol-type phenol-formaldehyde resin (BRL-1251 ) were compounded in a slurry mixer for about 20 minutes. The compound or mixture thus obtained was squeezed onto a 10-mesh glass cloth backed with polypropylene film (Mylar), through a 6-mesh stainless steel stencil superimposed on the cloth, to produce the cloth with a 2 mm. thick compound layer formed on one side thereof by use of a squeegee made of rigid polyurethane. This film-backed cloth with the compound layer thereon was dried at 100° C. and reversed to remove the film (Mylar) backing from the cloth thereby exposing the reverse side of the compound layer, this side being then covered with the same compound by squeezing it through the 6-mesh stainless steel stencil, the form thereon a compound layer of the same 2 mm. thickness. There was thus produced a green cutting grinding stone consisting of two compound layers bonded to each other with their patterned sides kept outside, respectively, these sides being patterned by the 6-mesh stainless steel stencil. The green grinding stone was subsequently aged at a temperature of 175° C. for 2 hours to obtain the desired cutting grinding stone.

EXAMPLE 2

The raw materials used in this example were as follows:

| | |
|---|---|
| Semifriable fused alumina abrasive particles (Carborundum Co., C-32, No. 60) | 60 parts by weight |
| Novolak-type phenol-formaldehyde resin (Varcum-1940 | 20 parts by weight |
| Furfural | 10 parts by weight |
| Powdery cryolite (finer than No. 120) | 10 parts by weight |

The phenol-formaldehyde resin was firstly dissolved in the furfural. To the resulting solution were added the abrasive particles and the powdery cryolite under agitation to form a homogeneous mixture thereof. The homogeneous mixture was squeezed through a 24-mesh nylon stencil onto a 0.02 mm. thick polyethylene film by a rigid nitrile rubber squeegee, to form a 3 mm. thick layer thereof on the film; and, after the removal of the stencil from the layer, another similar layer was formed on the previously formed layer by superimposing the same polyethylene film on the latter and then squeezing the mixture through the nylon stencil onto this film. Such a layer-forming operation was repeated 10 times to form a green grinding stone of 30 mm. in thickness, the green stone being then aged at a temperature of 170° C. to obtain the desired grinding stone.

EXAMPLE 3

The starting materials used were as follows:

| | Parts by weight |
|---|---|
| Black silicon carbide abrasive (Carborundum Co., C-6, No. 24) | 70 |
| Styrene-butadiene rubber (SBR) | 25 |
| Toluol | 45 |
| Fine-powdered sulfur | 0.5 |

The styrene-butadiene rubber and the fine-powdered sulfur were firstly added to and mixed with the toluol to form a homogeneous mixture thereof. To the mixture was then bit by bit added the black silicon carbide abrasive particles, and these were mixed to form a compound thereof.

The compound so formed was squeezed through a 4.2-mesh stainless steel stencil onto a 2 mm. thick nonwoven fabric made of 50-denier nylon filaments by use of a rigid polyurethane squeegee, to form a 3 mm. thick layer of the compound on the fabric. After removing the stencil from the compound layer, the layer was vulcanized to produce a flat grinder having on one side thereof the pattern of the 4.2-mesh stencil and backed on the other side thereof with the nonwoven fabric. To the flat grinding stone was concentrically bonded, using an epoxy binder, a conical disc-type hub to obtain an offset grinding stone.

EXAMPLE 4

The starting materials used were as follows:

| | Parts by weight |
|---|---|
| Green silicon carbide abrasive (Carborundum Co., C-5) No. 46 | 65 |
| Rubber-modified phenol-formaldehyde resin (U. C. Corp. BRP 8219) | 20 |
| Iron sulfide in powder form (finer than No. 240) | 5 |
| Methanol | 10 |

The rubber-modified phenol-formaldehyde resin was dissolved in the methanol, and to the resulting solution were added the powdery iron sulfide and the abrasive, followed by mixing them to form a homogeneous compound thereof. By using the same procedure as in example 1, the compound was squeezed through a 24-mesh netlike nylon stencil onto a 16-mesh glass cloth with a backing of polypropylene film by use of wooden squeegee, to form a 7 mm. thick layer of the compound on the glass cloth. By repeating this procedure, there were prepared two such layers which were then dried at 60° C. These two dried layers placed one upon another with their glass cloth-covered side kept outside were placed between two flat refractory plates, and the resulting assembly was cured at 170° C. for 3 hours to obtain a cutting grinding stone.

EXAMPLE 5

As the starting materials there used the following:

| | Parts by weight |
|---|---|
| Zirconia-containing fused alumina abrasive (Carborundum Co. R-71) No. 6 | 65 |
| Unsaturated polyester (Vibrin 135, US Rubber Co., Naugatuck Chemical Div.) | 23 |
| Ethyl methyl ketone peroxide | 2 |
| Iron sulfide in powder form (finer than No. 240) | 3 |
| Cryolite in powder form (finer than No. 240) | 7 |

The ethyl methyl ketone peroxide was added to a mixture made by thoroughly mixing the other four starting materials, to produce a compound of the five starting materials, which compound was soon squeezed through a 4-mesh brass, plate stencil onto an oil-impregnated waterproof paper to form a 5 mm. thick compound layer. Left intact for 1 hour after their formation, four of such layers were superimposed one upon another to form a green flat grinding stone which was then cured at 200° C. for 4 hours to obtain a desired flat grinding stone.

EXAMPLE 6

The starting materials used were as follows:

| | Parts by weight |
|---|---|
| Semifriable fused alumina abrasive particles (Carborundum Co., C-32, No.80) | 80 |
| Novolak-type phenol-formaldehyde resin (Varcum 3337) | 12 |
| Furfural | 8 |

The novolak-type phenol-formaldehyde resin was dissolved in the furfural and the resulting solution was heated to approximately 60° C. The solution was then incorporated with the abrasive particles to obtain a uniform mixture thereof while keeping it at about 60° C. during the mixing. The mixture kept at about 60° C. was squeezed through a 6-mesh stainless steel stencil heated to approximately 70° C. by an infrared lamp, onto a 0.1 mm. thick nonwoven glass fiber cloth with a 0.3 mm. thick spring steel squeegee to form a 2 mm. thick layer of the mixture on the glass fiber cloth. The stainless steel stencil was then removed from the layer, and a 12-mesh nonwoven glass fiber cloth was placed on the layer to form a 4 mm. thick flat-type green grinding stone, consisting to two 2 mm. thick layers with the glass fiber cloth interposed therebetween, by repeating the same squeezing operation as mentioned above. The green grinding stone was placed in the dies as shown in FIG. 9 and cured at 150° C. to obtain an offset-type grinding stone as shown in FIGS. 7 and 8.

What is claimed is:

1. A process for the manufacture of a thin grinding stone with a screen pattern on the abrading surface, comprising preparing a homogeneous mixture of a desired viscosity comprising
   30–90 percent by weight of abrasive particles and
   5–70 percent of a liquid binder selected from the group consisting of resol phenol-formaldehyde resins, novolak phenol-formaldehyde resins in liquidized form, the mixtures thereof and epoxy resins,
   squeezing the mixture onto a support through a screen, the mesh size of which is larger than the size of the abrasive particles and which is kept suitably apart from the support, to form a thin layer of the mixture between the support and screen,
   removing the screen from the layer to recover the layer backed with the support and having on the surface a depressed pattern printed by the screen, and
   then curing and aging the mass to obtain the desired thin grinding stone with the depressed pattern thereon thereby enhancing its grinding performance.

2. A process according to claim 1, wherein the meshes of the screen take a form selected from round, triangular, square and hexagonal forms.

3. A process according to claim 1, wherein the mixture is squeezed with a squeegee.

4. A process according to claim 1, wherein the abrasive particles have a 12- to 2,000-mesh size.

5. A process according to claim 1, wherein the screen has a 3- to 220-mesh size.

6. A process according to claim 1, wherein the abrasive is selected from the group consisting of fused alumina, sintered alumina, silicon carbide, boron carbide, emery, garnet and diamond.

7. A process according to claim 1, wherein the support is selected from the group consisting of paper, glass fiber cloth, nonwoven glass fiber cloth, and nonwoven synthetic resin fiber cloth.

8. A process for the manufacture of a multilayer grinding stone, characterized by superimposing one upon another at least two thin layers backed with a support and having a depressed pattern printed by a screen produced according to the process of claim 1, and then curing and aging the whole to obtain the desired multilayer grinder with the depressed pattern thereon.

* * * * *